United States Patent Office 3,335,125
Patented Aug. 8, 1967

3,335,125
MONOAZO NITRO THIAZOLE DYESTUFFS
Hugo Illy, Toms River, N.J., assignor to Ciba Limited,
Basel, Switzerland, a company of Switzerland
No Drawing. Filed Aug. 29, 1963, Ser. No. 305,540
Claims priority, application Switzerland, Oct. 22, 1959,
79,748
6 Claims. (Cl. 260—158)

This is a continuation-in-part application of my co-pending application Ser. No. 63,268, filed Oct. 18, 1960 (now abandoned).

This invention provides valuable, new monoazo-dyestuffs which are free from sulfonic acid groups and correspond to the formula (1) 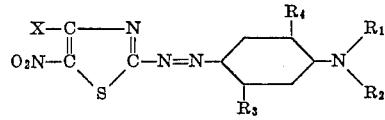

in which X represents an alkyl radical, for example a methyl, n-alkyl or n-butyl group, or more especially a hydrogen atom, $R_1$ and $R_2$ each represent an aliphatic radical, $R_3$ represents a hydrogen atom, a halogen atom or an alkyl or alkoxy group or an aliphatic acylamino group, and $R_4$ represents a hydrogen atom or an alkyl or alkoxy group, and in which at least one of the symbols $R_1$, $R_2$ and $R_3$ contains an aliphatically bound carboxyl group.

The invention also provides a process for the manufacture of the monoazo-dyestuffs of the above Formula 1, wherein a diazo-compound of an amine of the formula (2) 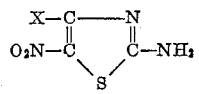

in which X has the meaning given above is coupled with an amine which is free from sulfonic acid groups and corresponds to the formula (3) 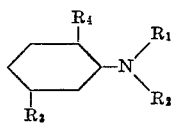

in which $R_1$, $R_2$, $R_3$ and $R_4$ have the meanings given above.

Of special interest are those coupling components which contain the carboxyl group bound to at least one of the residues $R_1$ or $R_2$. $R_1$ and $R_2$ each preferably represent an unsubstituted lower alkyl group, such as methyl, alkyl or allyl group, a lower hydroxyalkyl group, for example a hydroxyethyl or γ-hydroxypropyl group, or an hydroxyethoxyethyl group, a halogen-alkyl group, for example a β-chloroethyl or β-chloro-γ-hydroxypropyl group, an epoxyalkyl group, a lower cyanalkyl, and especially a cyanethyl group, or a lower carbalkoxyalkyl group. The term lower in this connection means "containing at most 6 C-atoms." Advantageously one of the radicals $R_1$ and $R_2$ represents a group of one of the following formulae

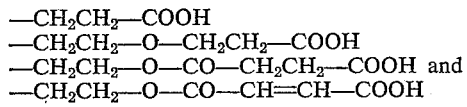

$R_3$ represents, for example, a hydrogen atom, a halogen atom, a methyl or methoxy group or an acylamino group derived from a mono- or di-carboxylic acid containing at most 6 carbon atoms, for example, an acetylamino group, a propionylamino group or one of the groups of the formulae.

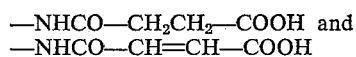

As examples of suitable coupling components there may be mentioned the following amines:

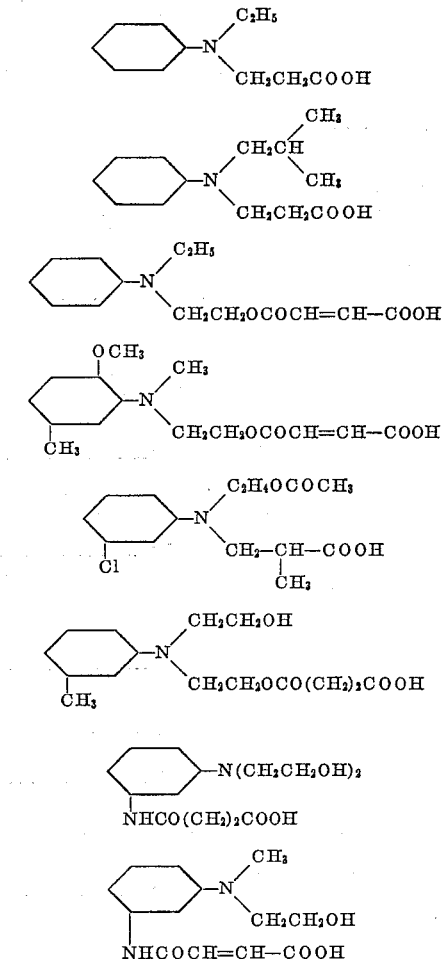

The aforesaid coupling components can be obtained, for example, by hydrolyzing the corresponding cyanalkyl- or carbethoxyethyl-anilines, or by the additive combination of maleic anhydride or succinic anhydride with oxy-alkylanilines or by the additive combination of acrylic acid or methacrylic acid with alkyl anilines by methods in themselves known.

The diazotization of the amines used as coupling components can be carried out by methods in themselves known, for example, by means of a solution of nitrosyl-sulfuric acid in concentrated sulfuric acid.

The coupling can also be carried out by a method in itself known, for example, in a neutral to acid medium, and, if desired, in the presence of sodium acetate.

The dyestuffs of this invention are suitable for dyeing and printing fibers and fabrics of cellulose esters or ethers, especially cellulose acetate artificial silk, and also fibers of cellulose triacetate, polyethylene terephthalates, polyamides or polyurethanes form a neutral to weakly acid dyebath. On the aforesaid materials there are produced pure blue dyeings of good fastness to light, gas and sublimation.

Compared with the dyestuffs described in Patents No. 2,351,133 (Knight) and No. 2,659,719 (Dickey) the best comparable dyestuffs of the present invention yield dyeings on cellulose triacetate and polyamide (nylon) which show a substantially improved fastness to sublimation.

The following examples illustrate the invention, the parts and percentages being by weight unless otherwise stated, and the relationship of parts by weight to parts by volume being the same as that of the kilogram to the liter.

EXAMPLE 1

5.8 parts of 2-amino-5-nitrothiazole are added in portions to a mixture of 20 parts by volume of concentrated sulfuric acid in which 2.8 parts of sodium nitrite have been dissolved, and a mixture of 35 parts by volume of glacial acetic acid and 5 parts of proprionic acid at 0° C. are introduced and the whole is stirred for 3 hours at 0 to 5° C.

After the addition of 2 parts of urea, the resulting clear, diazo-solution is run into a solution of 10.5 parts of N-ethyl-N-hydroxyethyl-aniline maleic acid semi-ester and 7 parts of sodium carbonate in 100 parts of water.

Coupling starts immediately. The dyestuff suspension so obtained is poured onto 300 parts of water and 50 parts of ice. The dyestuff is precipitated in the form of a dark powder and has the formula

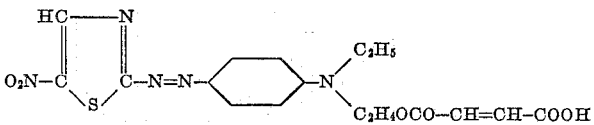

The dyestuff is isolated by filtration and washed neutral with water.

The coupling component is prepared in the following manner: 16.5 parts of N-ethyl-N-hydroxyethylaminobenzene and 11.5 parts of maleic anhydride are stirred together on an oil bath having a temperature of 100° C. for 4 hours. After cooling the whole to 50° C. a 2 N-solution of caustic soda is added, while stirring, until the pH value of the mixture is 8, whereupon the product passes into solution. After filtering the solution over animal charcoal, the clear solution can be used directly for coupling.

When the amines given in Column I of the following table are diazotized in the manner described in this example and diazotized with the coupling components given in Column II, dyestuffs are obtained which dye cellulose acetate artificial silk the tints given in Column III.

| I | II | III |
|---|---|---|
| 2-amino-5-nitrothiazole | Phenyl-N(CH$_3$)(C$_2$H$_4$OOC—CH=CH—COOH) | Reddish blue. |
| Do | Phenyl-N(CH$_3$)(C$_2$H$_4$—COOH) | Do. |
| Do | Phenyl-N(C$_4$H$_9$)(C$_2$H$_4$—COOH) | Blue. |
| Do | 3-OCH$_3$, 4-CH$_3$ phenyl-N(C$_2$H$_4$OH)(C$_2$H$_4$OCO—CH=CH—COOH) | Greenish blue. |
| Do | 3-CH$_3$ phenyl-N(C$_2$H$_4$COOH)(CH$_2$—CHOH—CH$_2$OH) | Blue. |
| Do | 3-CH$_3$ phenyl-N(C$_2$H$_4$OH)(C$_2$H$_4$OCO—CH=CH—COOH) | Do. |
| Do | 3-Cl phenyl-N(C$_2$H$_5$)(C$_2$H$_4$OCO—(CH$_2$)$_2$—COOH) | Reddish blue. |
| Do | 4-(NH—CO—CH$_2$CH$_2$—COOH) phenyl-N(C$_2$H$_4$OH)$_2$ | Blue. |
| Do | 3-OCH$_3$ phenyl-N(C$_2$H$_4$COOH)(C$_2$H$_4$OH) | Reddish blue. |
| Do | Phenyl-N(C$_2$H$_5$)(C$_2$H$_4$—O—C$_2$H$_4$—COOH) | Do. |

EXAMPLE 2

14.5 parts of 2-amino-5-nitrothiazole are diazotized in the manner described in Example 1. The clear diazo-solution is added, while cooling with ice, to a solution of 22.5 parts of the compound of the formula

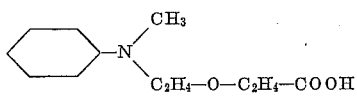

The whole is stirred for one hour while cooling with ice, and stirred on to 500 parts of water. The dyestuff which precipitates has the formula

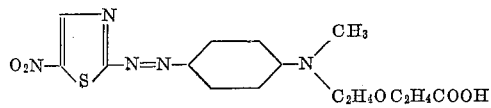

and is isolated by filtration.

The coupling component used in this example can be prepared as follows:

15.1 parts of N-methyl-N-(oxyethyl)-aminobenzene are mixed with 2 parts of a solution of sodium ethylate (5 parts of sodium in 100 parts of ethanol) and the mixture is heated to 40 to 45° C. 10 parts of acrylonitrile are then added dropwise in such manner that the reaction temperaure does not rise above 60° C., and then the whole is stirred for a short time longer at 40 to 45° C.

The N-methyl-N - cyanethyloxyethylaminobenzene so obtained is added dropwise at 60° C. to a mixture of 15 parts of sulfuric acid of 96% strength, 10 parts of water and 5 parts of glacial acetic acid, and the whole is stirred under reflux for 4 hours. After allowing the mixture to cool, 500 parts of water and 30 parts of sodium carbonate are added. The clear solution is used directly for coupling.

EXAMPLE 3

5.8 parts of 2-amino-5-nitrothiazole are diazotized in the manner described in Example 1. The clear diazo-solution is run into a solution, rendered alkaline with sodium carbonate of 8.28 grams of N-ethyl-N-carboxyethyl-3-toluidine. When the coupling is complete, the dyestuff is diluted with 700 ml. of water and isolated by filtration. It has the formula

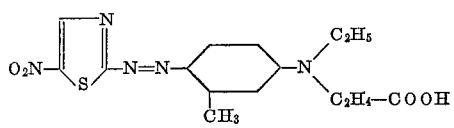

The N-ethyl-N-carboxyethyl-3-toluidine is obtained by the additive combination of acrylic acid of 70% strength with N-ethyl-3-toluidine on a water bath by a known method. The solution of the sodium salt rendered weakly acid with sodium hydroxide is freed from traces of unreacted N-ethyl-3-toluidine by steam distillation. The clear solution is used for coupling.

EXAMPLE 4

0.5 part of the dyestuff described in Example 1 is ground with 0.5 part of 2,2'-dinaphthyl-methane disulfonic acid to form a fine dispersion. The dispersion is added to a dyebath consisting of 3 parts of glacial acetic acid and 3 parts of N-benzyl-μ-heptadecyl-benzimidazole disulfonic acid in 3000 parts of water. 100 parts of well wetted cellulose acetate artificial silk are entered into the dyebath at 40° C., the temperature is raised to 80° C. and dyeing is continued for one hour at 80° C. The cellulose acetate artificial silk is dyed a reddish blue tint, and the dyeing is distinguished by its excellent fastness to gas and light.

EXAMPLE 5

1 part of the dyestuff obtained as described in Example 3 is pasted with a fatty alcohol-ethylene oxide condensation product, and diluted with water to 4000 parts, and 1.6 parts of glacial acetic acid and 1 part of a fatty alcohol-ethylene oxide condensation product are added. 100 parts of cellulose triacetate fabric are entered into the dyebath at 30° C., the bath is raised to the boil, and dyeing is carried out for one hour at the boil, whereby a blue dyeing of excellent fastness to light, gas and sublimation is obtained.

What is claimed is:

1. A monoazo dyestuff which is free from sulfonic acid groups and which is of the formula

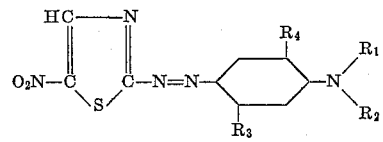

in which $R_1$ is a member selected from the group consisting of alkyl having up to 6 carbon atoms and hydroxyalkyl groups having up to 6 carbon atoms, $R_2$ is a member selected from the group consisting of lower hydroxyalkyl, lower carboxyalkyl and the groups of the formulae

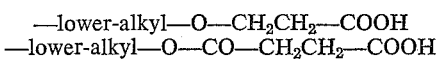

and

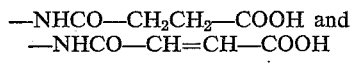

$R_3$ is a member selected from the group consisting of H, Cl, lower alkyl, lower alkoxy, lower alkanoylamino and the groups of the formulae —NHCO—CH$_2$CH$_2$—COOH and
—NHCO—CH=CH—COOH one of the radicals $R_2$ and $R_3$ having a carboxyl group, and $R_4$ is a member selected from the group consisting of H, lower alkyl and lower alkoxy.

2. The dyestuff of the formula

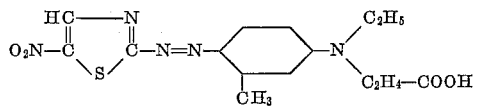

3. The dyestuff of the formula

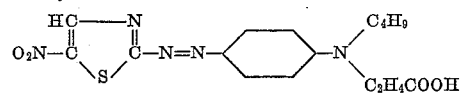

4. The dyestuff of the formula

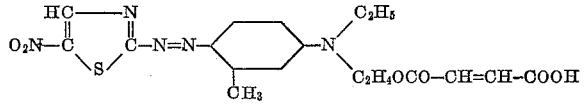

5. The dyestuff of the formula

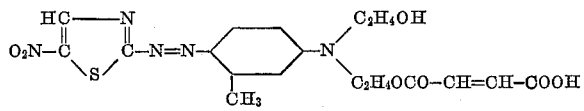

6. The dyestuff of the formula

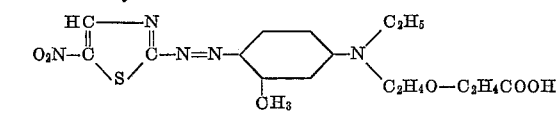

References Cited

UNITED STATES PATENTS 3,097,198   7/1963   Fishwick et al. _____ 260—158 X

CHARLES B. PARKER, *Primary Examiner.*

D. M. PAPUGA, *Assistant Examiner.*